United States Patent
Jackson

(10) Patent No.: US 6,322,478 B1
(45) Date of Patent: Nov. 27, 2001

(54) TRANSMISSION CONTROL SYSTEM FOR A VEHICLE

(75) Inventor: Neil David Jackson, Warwickshire (GB)

(73) Assignee: Rover Group Limited, Warwick (GB)

( * ) Notice: Subject to any disclaimer, the term of this patent is extended or adjusted under 35 U.S.C. 154(b) by 0 days.

(21) Appl. No.: 09/403,484

(22) PCT Filed: May 1, 1998

(86) PCT No.: PCT/GB98/01288

§ 371 Date: Oct. 21, 1999

§ 102(e) Date: Oct. 21, 1999

(87) PCT Pub. No.: WO98/50248

PCT Pub. Date: Nov. 12, 1998

(30) Foreign Application Priority Data

May 7, 1997 (GB) .................................................. 9709074

(51) Int. Cl.⁷ .................................................. B60K 41/04
(52) U.S. Cl. .............................. 477/109; 477/110; 477/37
(58) Field of Search .......................... 477/109, 45, 34, 477/37, 44, 46, 110; 364/424.01, 434.01; 474/11, 12

(56) References Cited

U.S. PATENT DOCUMENTS

| 4,653,005 | 3/1987 | Osanai et al. ............... 364/424.1 |
|---|---|---|
| 4,764,155 | 8/1988 | Kumura et al. ............... 474/12 |
| 5,042,324 | * 8/1991 | Suzuki ............... 74/857 |
| 5,433,676 | * 7/1995 | Abe et al. ............... 477/109 |
| 5,517,410 | * 5/1996 | Nakagawa et al. ............... 364/424.1 |
| 5,749,804 | * 5/1998 | Toukura ............... 477/47 |
| 6,007,452 | * 12/1999 | Sawada et al. ............... 477/45 |
| 6,027,425 | * 2/2000 | Sakaguchi et al. ............... 477/48 |
| 6,030,313 | * 2/2000 | Sawada et al. ............... 477/46 |
| 6,102,831 | * 8/2000 | Wakahara et al. ............... 477/169 |

FOREIGN PATENT DOCUMENTS

| 4120540 | 6/1991 | (DE) . |
|---|---|---|
| 0530381 | 3/1993 | (EP) . |
| 407223465 | * 8/1995 | (JP) . |
| 94/24463 | 10/1994 | (WO) . |

* cited by examiner

*Primary Examiner*—Sherry Estremsky
*Assistant Examiner*—Tisha D. Lewis
(74) *Attorney, Agent, or Firm*—Davis & Bujold, P.L.L.C.

(57) ABSTRACT

A CVT controller 22 of a vehicle 10 communicates with the engine management system (EMS) 20. When a manual shift between simulated fixed ratios is performed, the CVT controller 22 sends a shift signal to the EMS 20 which alters the engine torque for the duration of the shift in order to simulate a manual shift to provide, for example, a sporty feel to the vehicle 10.

25 Claims, 1 Drawing Sheet

TRANSMISSION CONTROL SYSTEM FOR A VEHICLE

FIELD OF THE INVENTION

Figure 1:
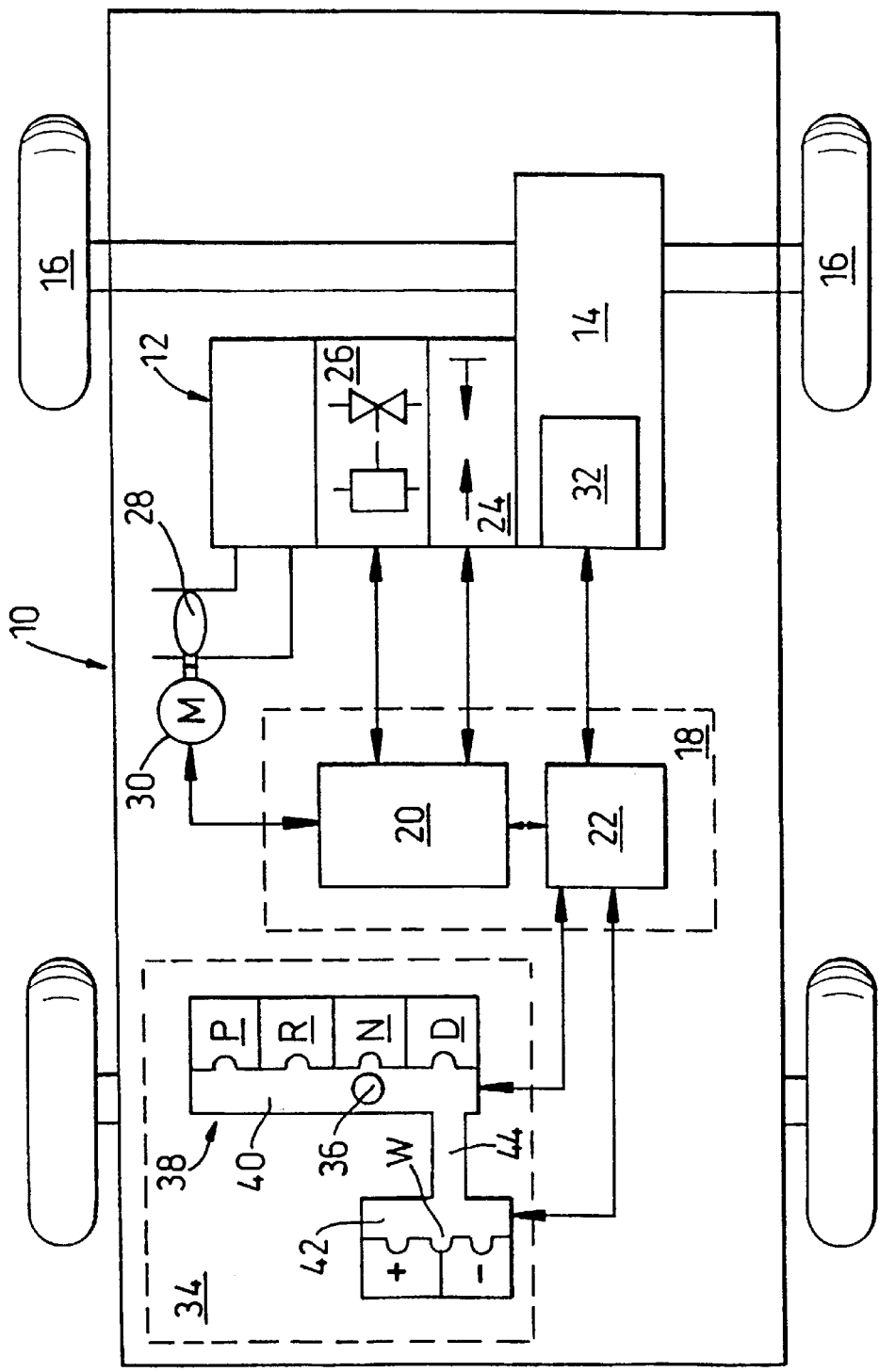

This invention relates to transmission control systems for vehicles and in particular to a transmission control system for a continuously variable transmission suitable for use in a vehicle; to a method of controlling such a transmission control system; and to a vehicle having such a transmission control system.

BACKGROUND OF THE INVENTION

It is known to control a continuously variable transmission (CVT) by operating an associated prime mover at its optimum efficiency and by continually varying the output ratio of the transmission to fulfill the demands for torque output placed on the powertrain. It is an object of the control systems for some known CVTs to provide a smooth output from the transmission throughout the operating range of the powertrain.

When such a CVT is fitted to a vehicle, it is usually the aim of the designer to ensure that the CVT has as smooth a torque output as possible. In this way, a user experiences a power delivery which is refined and seamless, i.e. devoid of step changes. One such prior art system is disclosed in U.S. Pat. No. 4,653,005.

For some applications, however, it is desirable to provide noticeable changes in powertrain output, in order to provide powertrain feedback to the user. For example, in a sports car it is often perceived that the driving experience should involve feedback from the powertrain at points in the power delivery which would simulate drops and/or surges in torque around gear shifts and thus be reminiscent of the manual gear shifts beloved of some users of traditional or classic sports cars.

It is an object of this invention to provide: an improved transmission control system for a continuously variable transmission suitable for use in a vehicle; a method of controlling such an improved transmission control system; and to provide a vehicle having such an improved transmission control system.

SUMMARY OF THE INVENTION

According to the invention there is provided a transmission control system for a vehicle comprising a prime mover control means arranged in use to control the torque output from a prime mover and a transmission control means arranged in use to control a continuously variable transmission so as to operate in a plurality of substantially discrete ratios and to control shifts between said ratios, characterised in that the transmission control means is arranged to provide a shift signal to the prime mover control means indicative of a shift between said ratios and the prime mover control means is arranged to temporarily alter said torque output in response to said shift signal, whereby in use a user is provided with feedback which is indicative of said shift and which is in the form of a substantially stepped change in said torque output.

The prime mover control means may be arranged to alter said torque output by reducing it and may be arranged to raise said torque output at the end of a shift between said ratios.

The prime mover control means may be arranged to alter said torque output by increasing it and may be arranged to reduce said torque output at the end of a shift between said ratios.

The prime mover control means may be arranged to alter said torque output substantially for the duration of each shift between said ratios.

The transmission control means may comprise a manual input means for manual selection of shifts between said ratios.

The prime mover may comprise an engine and the prime mover control means may be arranged to alter said torque output by varying the supply of fuel to a cylinder of said engine.

The prime mover may comprise a spark ignition engine and the prime mover control means may be arranged to alter said torque output by varying the ignition timing of said engine.

The prime mover may comprise an engine and the prime mover control means may be arranged to alter said torque output by varying the supply of air to a cylinder of said engine.

The prime mover may comprise an electrical machine and the prime mover control means may be arranged to alter said torque output by varying an electrical supply of said electrical machine.

The invention also provides a vehicle having a transmission control system according to the invention.

The invention also provides a method of controlling a transmission control system for a vehicle comprising a prime mover control means arranged in use to control the torque output from a prime mover and a transmission control means arranged in use to control a continuously variable transmission so as to operate in a plurality of substantially discrete ratios and to control shifts between said ratios, characterized in that the method includes the steps of:
  a) providing a shift signal from the transmission control means to the prime mover control means indicative of a shift between said ratios; and
  b) altering temporarily said torque output in response to said shift signal;
  whereby in use a user is provided with feedback which is indicative of said shift and which is in the form of a substantially stepped change in said torque output.

The method may include altering said torque output by reducing it and may include raising said torque output at the end of a shift between said ratios.

The method may include altering said torque output by increasing it and may include reducing said torque output at the end of a shift between said ratios.

The method may include altering said torque output substantially for the duration of each shift between said ratios.

The method may include manually selecting shifts between said ratios using a manual input means comprising part of the transmission control means.

The prime mover may comprise an engine and the method may include altering said torque output by varying the supply of fuel to a cylinder of said engine.

The prime mover may comprise a spark ignition engine and the method may include altering said torque output by varying the ignition timing of said engine.

The prime mover may comprise an engine and the method may include altering said torque output by varying the supply of air to a cylinder of said engine.

The prime mover may comprise an electrical machine and the method may include altering said torque output by varying an electrical supply of said electrical machine.

BRIEF DESCRIPTION OF THE DRAWING(S)

The invention will now be described by way of example with reference to the accompanying drawing, in which:

FIG. 1 is a schematic diagram of a vehicle having a transmission control system according to the invention.

DESCRIPTION OF THE PREFERRED EMBODIMENT(S)

Referring to the figure, a vehicle 10 comprises a prime mover in the form of a spark ignition engine 12 connected to a continuously variable transmission (CVT) 14 which provides drive to a set of wheels 16.

The engine 12 and the CVT 14 are controlled by a combined powertrain controller 18, comprising an engine management system (EMS) 20 and a CVT controller 22 which communicate with each other.

The engine 12 has an ignition system 24 and a fueling system comprising a fuel injection means 26 and a throttle butterfly 28 driven by a motor 30, all under the control of the EMS 20 to regulate the torque output of the engine 12. The CVT 14 has a shift mechanism 32, which is under the control of the CVT controller 22, to control its output to the wheels 16.

The vehicle 10 further comprises a transmission selector 34 having a user operated gear lever 36 which is manually slideable between positions along a transmission gate 38 and which provides the CVT controller 22 with a signal indicating in which of the positions the gear lever 36 has been placed. The gate 38 is divided into a first track 40 and a second track 42 which are interconnected by a cross track 44.

When moved along the first track 40, the selector lever 36 selects between positions for; park P, reverse R, neutral N and drive D and can operate at any ratio within its range in a conventional CVT manner. When in drive D, the selector lever 36 can be moved across the cross track 44 and into the second track 42.

When the selector lever 36 is in the second track 42, it is spring loaded to a waiting position W between an up-shift+ and a down-shift- position. The gear lever is manually moveable into the up-shift+ or down-shift- position and returns to the waiting position W by the spring loading on its release between movements.

When the selector lever 36 is moved between the up-shift+ and the down-shift- positions, the CVT controller 22 controls the shift mechanism 32 to operate the CVT 14 in a plurality of discrete simulated fixed ratios and to shift up or down between them in accordance with the manual selection. The continuously variable nature of the operation of the CVT 14 makes it difficult to permanently fix the CVT output at specific ratios and so the CVT controller 22 simulates fixed ratios by continuously adjusting the shift mechanism 32 to operate around fixed points of the CVT output characteristic.

On each manually selected up-shift or down-shift, initiated using the selector lever 36, the CVT controller 22 sends a shift start signal to the EMS 20. On receipt of the shift start signal, the EMS 20 temporarily alters the torque output of the engine 12.

The torque output is altered with time at the start of each ratio shift and simulates the powertrain feedback the driver would experience if he were to be operating a vehicle fitted with a manual shift mechanism, i.e. the feedback is in the form of a substantially stepped change in the torque output, as if an accelerator pedal (not shown) were to be released and a clutch pedal (not shown) were to be depressed.

When the torque has been altered, the CVT controller 22 operates the shift mechanism 32 to select a higher or lower simulated fixed ratio in accordance with the movement of the selector lever 36 along the second track 42.

When the shift has been carried out, the CVT controller 22 sends a shift end signal to the EMS 20, which then alters the torque output of the engine 12 with time so that it matches the previous setting or adopts a new setting appropriate for the newly selected transmission ratio. The alteration of the torque output at the end of a ratio shift simulates the powertrain feedback the driver would experience if he were to be operating a vehicle fitted with a manual shift mechanism, i.e. the feedback is in the form of a substantially stepped change in the torque output, as if a clutch pedal were to be released and an accelerator pedal were to be depressed.

The torque output is altered by using one or more of three techniques selected from a look-up table programmed in the EMS 20, the selection being made in a tuneable manner depending on the instant running conditions of the engine 12 and is further tuneable to take account of individual user preferences. The three methods of altering the torque output are: by varying the quantity of fuel supplied to the engine 12 by the fuel injection system 26; by the EMS 20 controlling the motor 30 to partially or fully open or close the throttle butterfly 28 and thereby varying the supply of air to the engine 12; and by controlling the ignition system 24 to vary the spark timing.

The alteration in torque output may be by its reduction, increase or a mixture of these two options as preferred, in order to suit each users' perceptions of feedback for certain vehicles or under certain circumstances.

If the torque output is reduced for a shift, it should be increased at the end of that shift. If on the other hand the torque output is raised for a shift, it should be lowered at the end of that shift. In either case, the increase or reduction in torque output at the end of the shift may not be necessary, depending on the torque output demand placed on the engine 12 by the newly selected ratio.

The alteration in torque output does not have to be limited to the duration of the ratio shift itself but may be implemented for a period varied in accordance with driver expectations, which would be programmed in the combined powertrain controller 18 during development testing. The simulation of a manual selection of ratios thus provides a sporty feel to the vehicle 10 when the selector lever 36 is operated in the second track 42.

This invention could also be applied to a CVT having a conventional cable operated throttle butterfly, rather than the drive-by-wire motor operated butterfly 30 of the embodiment described above. The powertrain controller could also comprise a fully integrated powertrain controller in which the EMS 20 and the CVT controller 22 are fully integrated in a single unit.

In a modification to the invention the prime mover comprises an electrical machine, for example a traction motor, and the torque output is altered by varying an electrical supply of the machine, for example by current control.

What is claimed is:

1. A transmission control system for a vehicle having a prime mover connected to a continuously variable transmission, the prime mover supplying a torque output to the continuously variable transmission and the continuously variable transmission receiving the torque output from the prime mover and driving the vehicle, the transmission control system comprising:

a prime mover controller connected to the prime mover for controlling, during both acceleration and deceleration of the vehicle, the torque output of the prime mover; and a transmission controller connected to the continuously variable transmission for controlling the continuously variable transmission to operate, during operation of the vehicle, at a desired one of a plurality of substantially discrete gear ratios of the continuously variable transmission and for controlling shifting of the continuously variable transmission between the plurality of substantially discrete gear ratios of the continuously variable transmission;

wherein the transmission controller provides a shift signal to the prime mover controller indicative of a shift between two gear ratios of the plurality of substantially discrete gear ratios of the continuously variable transmission, the prime mover controller, upon receipt of the shift signal, temporarily alters the torque output of the primer mover, and an operator of the vehicle perceives a feedback signal, indicative of the shift between two gear ratios of the plurality of substantially discrete gear ratios of the continuously variable transmission, in the form of an increased stepped change in torque output of the prime mover.

2. The transmission control system according to claim 1, wherein the transmission control system includes a manual selector which is coupled to a shift mechanism of the continuously variable transmission via the transmission controller, the manual selector has both an upshift position and a downshift position, and the manual selector, when in the upshift position, facilitates an up shift of the plurality of substantially discrete gear ratios of the continuously variable transmission, and the manual selector, when in the downshift position, facilitates a down shift of the plurality of substantially discrete gear ratios of the continuously variable transmission.

3. The transmission control system according to claim 1, wherein the transmission control system includes a manual selector which is coupled to the transmission controller, and
the feedback signal is one of a drop and a surge in the torque output of the prime mover when the shift of each one of the plurality of substantially discrete gear ratios of the continuously variable transmission occurs.

4. The transmission control system according to claim 1, wherein the prime mover controller alters the torque output of the prime mover by reducing the torque output.

5. The transmission control system according to claim 1, wherein the prime mover controller alters the torque output of the prime mover by increasing the torque output.

6. The transmission control system according to claim 1, wherein the prime mover controller alters the torque output of the prime mover by raising the torque output at an end of a shift between the plurality of substantially discrete gear ratios of the continuously variable transmission.

7. The transmission control system according to claim 1, wherein the prime mover controller alters the torque output of the prime mover by reducing the torque output at an end of a shift between the plurality of substantially discrete gear ratios of the continuously variable transmission.

8. The transmission control system according to claim 1, wherein the prime mover controller includes a mechanism for altering the torque output of the prime mover for an entire duration of the shift between the plurality of substantially discrete gear ratios of the continuously variable transmission.

9. The transmission control system according to claim 1, wherein the prime mover is an engine and the prime mover controller is connected to a butterfly valve of the engine to alter the torque output of the prime mover by varying a supply of combustion air to the engine.

10. The transmission control system according to claim 1, wherein the prime mover is an engine and the prime mover controller is connected to a fuel valve of the engine to alter the torque output of the prime mover by varying a supply of combustion fuel to the engine.

11. The transmission control system according to claim 1, wherein the prime mover is an engine and the prime mover controller is connected to an ignition system of the engine to alter the torque output of the prime mover by varying the ignition timing of the engine.

12. The transmission control system according to claim 1, wherein the prime mover is an electric motor and the prime mover controller is connected to an electrical supply for the electric motor to alter the torque output of the electric motor by varying the supply of electricity to the electric motor.

13. The transmission control system according to claim 1, wherein the transmission controller and the prime mover controller are integrated into a combined powertrain unit.

14. A method of controlling a transmission control system for a vehicle having a prime mover connected to a continuously variable transmission, the prime mover supplying a torque output to the continuously variable transmission and the continuously variable transmission receiving the torque output from the prime mover and driving the vehicle, the method comprising the steps of:

connecting a prime mover controller to the prime mover for controlling, during both acceleration and deceleration of the vehicle, the torque output of the prime mover; and connecting a transmission controller to the continuously variable transmission for controlling the continuously variable transmission to operate, during operation of the vehicle, at a desired one of a plurality of substantially discrete gear ratios of the continuously variable transmission and for controlling shifting of the continuously variable transmission between the plurality of substantially discrete gear ratios of the continuously variable transmission;

providing, via the transmission controller, a shift signal to the prime mover controller indicative of a shift between two gear ratios of the plurality of substantially discrete gear ratios of the continuously variable transmission, and the prime mover controller, upon receipt of the shift signal, temporarily altering the torque output of the primer mover, and an operator of the vehicle perceiving a feedback signal, indicative of the shift between two gear ratios of the plurality of substantially discrete gear ratios of the continuously variable transmission, in the form of a substantially stepped change in torque output of the prime mover.

15. The method according to claim 14, further comprising the steps of providing the transmission control system with a manual selector coupled to a shift mechanism of the continuously variable transmission via the transmission controller, the manual selector having both an upshift position and a downshift position, and the manual selector, when in the upshift position, facilitating an up shift between two gear ratios of the plurality of substantially discrete gear ratios of the continuously variable transmission, and the manual selector, when in the downshift position, facilitating a down shift between two gear ratios of the plurality of substantially discrete gear ratios of the continuously variable transmission.

16. The method according to claim 14, further comprising the step of providing the transmission control system with a manual selector coupled to the transmission controller, and the manual selector facilitating the shift between two gear ratios of the plurality of substantially discrete gear ratios of the continuously variable trans mission, and the feedback signal is one of a drop and a surge in the torque output of the prime mover when the shift between two gear ratios of the plurality of substantially discrete gear ratios of the continuously variable transmission occurs.

17. The method according to claim 14, further comprising the step of controlling the prime mover controller to reduce the torque output of the prime mover.

18. The method according to claim 14, further comprising the step of controlling the prime mover controller to increase the torque output of the prime mover.

19. The method according to claim 14, further comprising the step of controlling the prime mover controller to raise the torque output of the prime mover at an end of a shift between the plurality of substantially discrete gear ratios of the continuously variable transmission.

20. The method according to claim 14, further comprising the step of controlling the prime mover controller to reduce the torque output of the prime mover at an end of a shift between the plurality of substantially discrete gear ratios of the continuously variable transmission.

21. The method according to claim 14, further comprising the step of providing the prime mover controller with a mechanism for altering the torque output of the prime mover for an entire duration of the shift between the plurality of substantially discrete gear ratios of the continuously variable transmission.

22. The method according to claim 14, further comprising the step of using an engine as the prime mover and connecting the prime mover controller to a valve of the engine for altering the torque output of the prime mover by varying a supply of fuel to the engine.

23. The method according to claim 14, further comprising the step of using an electrical motor as the prime mover and connecting the prime mover controller to an electrical supply for altering the torque output of the electrical motor by varying the electrical supply to the electrical motor.

24. A transmission control system for a vehicle having a prime mover connected to a continuously variable transmission, the prime mover supplying a torque output to the continuously variable transmission and the continuously variable transmission receiving the torque output from the prime mover and driving the vehicle, the transmission control system comprising:

a prime mover controller connected to the prime mover for controlling, during both acceleration and deceleration of the vehicle, the torque output of the prime mover; and a transmission controller connected to the continuously variable transmission for controlling the continuously variable transmission to operate, during operation of the vehicle, at a desired one of a plurality of substantially discrete gear ratios of the continuously variable transmission and for controlling shifting of the continuously variable transmission between the plurality of substantially discrete gear ratios of the continuously variable transmission;

the transmission controller provides a shift signal to the prime mover controller indicative of a shift between two gear ratios of the plurality of substantially discrete gear ratios of the continuously variable transmission, the prime mover controller, upon receipt of the shift signal, temporarily alters the torque output of the primer mover, and an operator of the vehicle perceives a feedback signal, indicative of the shift between two gear ratios of the plurality of substantially discrete gear ratios of the continuously variable transmission, in the form of a substantially stepped change in torque output of the prime mover; and wherein the prime mover controller alters the torque output of the prime mover by increasing the torque output.

25. A transmission control system for a vehicle having a prime mover connected to a continuously variable transmission, the prime mover supplying a torque output having a substantially constant rate of change to the continuously variable transmission and the continuously variable transmission receiving the torque output from the prime mover and driving the vehicle, the transmission control system comprising:

a prime mover controller connected to the prime mover for controlling, during both acceleration and deceleration of the vehicle, the torque output of the prime mover; and a transmission controller connected to the continuously variable transmission for controlling the continuously variable transmission to operate, during operation of the vehicle, at a desired one of a plurality of substantially discrete gear ratios of the continuously variable transmission and for controlling shifting of the continuously variable transmission between the plurality of substantially discrete gear ratios of the continuously variable transmission;

wherein the transmission controller provides a shift signal to the prime mover controller indicative of a shift between two gear ratios of the plurality of substantially discrete gear ratios of the continuously variable transmission, the prime mover controller, upon receipt of the shift signal, temporarily alters the torque output of the primer mover, and an operator of the vehicle perceives a feedback signal, indicative of the shift between two gear ratios of the plurality of substantially discrete gear ratios of the continuously variable transmission, in the form of an increase in the rate of change in the torque output supplied by the prime mover.

* * * * *